Patented June 27, 1939

2,163,611

UNITED STATES PATENT OFFICE 2,163,611

LIQUID ADHESIVE COMPOSITION

Alexander D. Macdonald, Malden, Mass., assignor to B. B. Chemical Co., Boston, Mass., a corporation of Massachusetts No Drawing. Application December 28, 1936, Serial No. 117,902

5 Claims. (Cl. 260—32)

This invention relates to polymerized chloroprene, and more particularly to liquid adhesive compositions prepared from plastic polymers of chloroprene.

Plastic polymerized chloroprene is chloroprene (also known as chloro-2-butadiene-1,3) which has been polymerized to such an extent that it may be worked on the rolls of a rubber mill and compounded with other ingredients in a manner similar to that in which crude rubber is treated. Such plastic polymerized chloroprene may be "cured" to a condition in which it resembles vulcanized rubber in exhibiting essentially elastic rather than plastic properties. This "curing" of plastic polymerized chloroprene, often spoken of as "vulcanization", is probably a further polymerization of the chloroprene, as distinguished from the vulcanization of rubber wherein sulphur is considered to be added to the rubber hydrocarbon.

An object of this invention is to provide improved liquid adhesive compositions embodying plastic polymerized chloroprene. Other objects are to provide such compositions having improved stability, that is, increased resistance to thickening and gelling over a period of time, and having improved flowing properties.

According to the present invention, the above and other objects are attained by incorporating diethylamine and an ethanolamine in a colloidal dispersion or solution of plastic polymerized chloroprene. In such composition the diethylamine and ethanolamine are preferably present in the proportion of about 2 to 3. Preferred ethanolamines are monoethanolamine, diethanolamine, and triethanolamine, or mixtures thereof. The total of the jointly present diethylamine and ethanolamine is preferably in the neighborhood of 5% of the polymerized chloroprene in the composition.

The advantages of the invention are particularly apparent in the preparation of adhesives from malodorant-free plastic polymerized chloroprene, such for example as described in United States Letters Patent No. 2,067,854, granted January 12, 1937, upon application of A. D. Macdonald. Thus, compositions prepared from malodorant-free plastic polymerized chloroprene and containing diethylamine and an ethanolamine have been observed, which after a substantial period of time were still fluid and exhibited satisfactory brushing qualities and only a moderate increase in viscosity, whereas similar compositions, not so stabilized, have, within a much shorter period, set or stiffened to a gell, in which condition they were useless for adhesive purposes.

The composition may and preferably does contain additional modifying and compounding ingredients, and in accordance with another aspect of the invention I have provided a method of inhibiting premature curing of plastic polymerized chloroprene during the preparation of the liquid adhesive. This is accomplished, where zinc oxide and magnesium oxide are to be present in the composition, by milling together part of the molodorant-free polymerized chloroprene with most or all of the zinc oxide and a major portion of the magnesium oxide and incorporating therewith during the milling a large proportion of the ethanolamine. The remainder of the polymer is milled with the balance of the magnesium oxide and another portion of the ethanolamine. Subsequently the separately milled batches are dissolved, dispersed or suspended in the solvent material, at which time the diethylamine and the balance of the ethanolamine may be incorporated.

An example of a preferred composition in accordance with this invention is as follows:

| | | |
|---|---|---|
| Malodorant-free plastic polymerized chloroprene (prepared in accordance with my copending application Serial No. 755,852) | grams | 907 |
| Magnesium oxide | do | 91 |
| Zinc oxide | do | 46 |
| Sulphur | do | 27 |
| Monoethanolamine | do | 30 |
| Diethylamine (88% solution) | do | 23 |
| Benzene | cc | 1656 |
| Trichlorethylene | cc | 1656 |
| Yield | gallon | 1 |

In the above composition it will be observed that the ratio by weight of diethylamine to the ethanolamine is about 2 to 3, and that the total of the diethylamine and the ethanolamine present, with respect to the polymerized chloroprene, is about 5.8%, or in other words, in the neighborhood of 5%.

According to one feature of the invention the compounding of the solid ingredients (with the exception of the sulphur) is carried out by dividing said ingredients into two batches. In batch I are placed (in terms of weight) about one-half of the malodorant-free plastic polymer of chloroprene, three-quarters of the magnesium oxide, all of the zinc oxide, and one-half of the monoethanolamine. In batch II are placed one-half of the polymerized chloroprene, onequarter of the magnesium oxide, and one-sixth of the monoethanolamine.

Illustrative compositions of batches I and II in numerical quantities by weight are as follows:

|  | Batch I | Batch II |
|---|---|---|
| Malodorant-free plastic polymerized chloroprene | *Grams* 453.5 | *Grams* 453.5 |
| Magnesium oxide | 68.3 | 22.7 |
| Monoethanolamine | 15 | 5 |
| Zinc oxide | 46 | 0 |

Batches I and II are milled separately at relatively low temperatures in an ordinary rubber mill. This is conveniently accomplished by water-cooling the rolls of the compounding mill sufficiently to keep the temperature of the ingredients below about 80° F. In the case of each batch, milling for a period of about 20 to 30 minutes is usually sufficient to compound the ingredients. Preferably the compounding is carried out by adding the ingredients to the plastic polymer in the order in which said materials are above listed. After the ingredients have been sufficiently milled the compounded material is sheeted out, for example, to a thickness of $\frac{1}{16}$ inch to $\frac{1}{8}$ inch, and cut into small pieces of not more than a few inches square. The compounded material of the batches is now ready to be dispersed in the solvent to form a colloidal solution.

Certain distinct advantages arise by compounding the above ingredients with the deodorized plastic polymer in two batches in the manner described above. Thus, batch II is milled in the absence of zinc oxide and the plastic polymer of this batch is therefore not subjected to any scorching action by said zinc oxide, and the presence of the monoethanolamide in this batch tends to inhibit premature curing of the polymer. Furthermore, by milling zinc oxide in batch I with the larger quantities of magnesium oxide and monoethanolamine, the protective effect of these ingredients results in inhibiting the scorching effect of the zinc oxide to an extent which results ultimately in greater stability of the liquid adhesive composition.

The compounded material of the two batches is dispersed or colloidally dissolved in the solvent as soon as practicable after the compounding, and preferably the same day. To dissolve the above quantities of ingredients 3312 cc. of solvent consisting of equal volumes of benzene and trichloroethylene may be placed in a water-jacketed and water-cooled churn and agitation commenced. The small pieces of compounded material from the above-described batches are added to the solvent as fast as previously added pieces are "wet out" by the solvent. The diethylamine and the balance of the monoethanolamine may be added to the solvent mixture in the churn. The sulphur is preferably added to the material in the churn when the dispersion or colloidal solution has become sufficiently viscous to support the sulphur in suspension. Thus, after all the compounded material has been added to the churn and agitated for about one-half hour, 27 grams of sulphur are added. The churning is continued for about 6 to 8 hours. During the entire solution process the temperature of the liquid composition is preferably maintained below about 80° F. by the cooling water circulating in the jacket of the churn.

The optimum viscosity of the liquid adhesive will depend on the particular use to which it is put. For example, in attaching outsoles to shoe uppers, and where the adhesive is to be brushed onto the shoe parts by hand, I have found that the viscosity of the liquid adhesive solution should be within the range of from 15 to 30 seconds and preferably from 23 to 28 seconds. Where for such purpose the adhesive is to be applied by extrusion or other mechanical means the viscosity of the adhesive may be higher and up to, for example, 50 seconds. This viscosity refers to the number of seconds required for a steel ball of 9.5 mm. ($\frac{3}{8}$ inch) diameter and weighing from 3.45 to 3.55 grams to drop 40 cm. through a sample of the liquid adhesive maintained at 25° C. in a glass tube of 19 mm. inside diameter.

For the purpose of preparing a composition within the desired viscosity range, it is sometimes practicable to withhold a portion of the solvent used to disperse the solid constituents of the composition and then after a test of the viscosity to add sufficient solvent to reduce the viscosity to within the desired range.

Where slow curing of the malodorant-free plastic polymer of chloroprene is desired the composition as thus prepared may be used directly for adhesive purposes. If, however, a faster curing of the plastic polymer is desired, then a solution of an accelerator in a suitable solvent may be added to the liquid adhesive composition. The accelerator preferably is added not more than 24 hours prior to the actual use of the liquid composition for adhesive purposes in order that premature curing may not take place. A satisfactory accelerator for this purpose is that known commercially as "Du Pont Accelerator #808" and which is a butyraldehyde aniline condensation product. An accelerating solution suitable for the above-described adhesive comprises 1 part by volume Accelerator #808 dissolved in 9 parts benzene. A liquid ounce of this solution may be stirred into a quart of adhesive just prior to use.

In the above composition the malodorant-free polymerized chloroprene is of course the adhesive material. The magnesium oxide serves, at least in part, to neutralize any hydrochloric acid which may be set free in the polymerized chloroprene and also to prevent scorching when zinc oxide and polymerized chloroprene are milled together. The zinc oxide appears to assist in the later curing or more complete polymerization of the plastic polymer. The sulphur appears to assist in the later curing of the polymer. The benzene and the trichloroethylene function of course as solvents or dispersing media for the polymerized chloroprene and associated materials.

The jointly present diethylamine and ethanolamine function, in accordance with a feature of the invention, to impart improved stability to the liquid adhesive composition, that is, to impart thereto increased resistance to thickening and gelling over a period of time. Thus, a liquid adhesive of the composition given in detail hereinbefore has been prepared with an initial viscosity of 25 seconds, and after storage under ordinary conditions for 9 weeks, the composition was still liquid, and the viscosity thereof had increased to 33 seconds, a moderate increase of only 33%. By way of contrast, compositions similar in nature, but not stabilized in the manner of this invention, have set or stiffened to a gell within a much shorter period than 9 weeks, and in such gelled condition these compositions could not be spread, and were useless for adhesive purposes.

The jointly present diethylamine and ethanolamine also function, in accordance with the invention, to impart improved flowing properties to the liquid adhesive compositions, that is to say, greater smoothness and ease of spreading over and application to a surface. Thus, a liquid adhesive of the composition detailed hereinabove exhibited, immediately after preparation and throughout a period of 9 weeks, a high degree of smoothness and ready flowability upon brush or other application thereof to a surface, whereas similar compositions, not stabilized in the manner of this invention, exhibited a certain degree of stringiness and resistance to spreading over a surface upon brush or other application thereto.

To summarize, it may be said that there is imparted to the adhesive composition by the joint presence of diethylamine and an ethanolamine a longer period of liquidity, and enhanced flowing properties during such longer period of liquidity.

In carrying out the adhesion of leather or shoe parts by means of the liquid adhesive composition of this invention, the leather parts are preferably first roughed in a suitable manner, such as by an emery wheel or a wire brush, in order to provide surfaces most advantageous for cementing. The liquid adhesive is then applied preferably to both surfaces to be united. The application of the adhesive may be by brush, by extrusion, or in any other suitable manner. The applied composition is then permitted to dry for a sufficient length of time to remove a major portion of the solvent. At the time of the application of the adhesive to the leather the leather may be water-moistened or, as known in the art, in temper. However, where conditions permit, it is desirable, though not necessary, to have the leather in an air-dry condition. Ordinarily a drying time of not more than about one hour is necessary before the adhesive-coated parts may be brought together under attaching pressure. On the other hand, the adhesive may be permitted to dry for as much as 4 to 6 hours before bringing the adhesive-coated parts together without seriously affecting the strength of bond. After a suitable drying period as described above, the parts are brought together under attaching pressure, either momentarily or for a longer period. By way of example, in the adhesive attaching of shoe parts an attaching pressure of 80 pounds per square inch has been found satisfactory. Lower attaching pressures may be employed but preferably a relatively high attaching pressure is used.

It will be understood that in manufacturing the new adhesive of my invention other compounding ingredients for plastic polymerized chloroprene than those specifically disclosed may be used, and also other solvents for said plastic polymers, for example, toluene, xylene, carbon tetrachloride, etc.

A form of polymerized chloroprene suitable for the purposes of this invention is the synthetic rubber-like material formerly known commercially as "DuPrene" and now to be known as "Neoprene", and which may be made by polymerizing chloroprene in the manner set forth in United States Letters Patent No. 1,950,436, granted March 13, 1934, upon an application of Ira Williams. The chloroprene itself may be made in the manner described in United States Letters Patent No. 1,950,431, granted March 13, 1934, upon an application of W. H. Carothers and A. M. Collins.

In so far as they are equivalents, this invention is to be construed sufficiently broadly to cover other haloprene polymers of butadiene, for example polymerized bromoprene, described in said Patent No. 1,950,431. Malodorant-free polymerized chloroprene and a method of deodorizing DuPrene are disclosed in application Serial No. 755,852, hereinbefore referred to. As has been pointed out hereinbefore, while the invention is applicable to ordinary malodorant plastic polymerized chloroprene, certain of its advantages are especially apparent in the preparation of adhesives from deodorized or malodorant-free plastic polymerized chloroprene.

Having described my invention, what I claim as new and desire to secure by Letters Patent of the United States is:

1. A liquid adhesive composition comprising malodorant-free plastic polymerized chloroprene, and compounding ingredients all dispersed in a solvent therefor, said composition being characterized by the joint presence of diethylamine and monoethanolamine therein in the total proportion by weight in the neighborhood of 5% of the polymerized chloroprene, and by resistance to thickening and gelling over a substantial period of time.

2. A liquid adhesive composition comprising malodorant-free plastic polymerized chloroprene and compounding ingredients all dispersed in a solvent therefor, and diethylamine and an ethanolamine in the proportion of approximately 2 to 3 by weight, said composition being characterized by resistance to thickening and gelling over a substantial period of time.

3. A liquid adhesive composition comprising malodorant-free plastic polymerized chloroprene and compounding ingredients all dispersed in a solvent therefor, and diethylamine and an ethanolamine in the total proportion by weight in the neighborhood of 5% of the polymerized chloroprene.

4. The method of preparing a liquid adhesive composition from plastic polymerized chloroprene and compounding ingredients including zinc oxide and an ethanolamine, which comprises milling all the zinc oxide and a major portion of the ethanolamine with a portion of the plastic polymer, whereby the scorching effect of the zinc oxide is inhibited, milling the balance of the ethanolamine with the remainder of the plastic polymer, and dissolving all of the milled material in a solvent therefor.

5. The method of preparing a liquid adhesive composition from plastic polymerized chloroprene and containing magnesium oxide, zinc oxide, diethylamine and an ethanolamine which comprises milling about half of the polymer with about half of the ethanolamine, three-quarters of the magnesium oxide and all of the zinc oxide, whereby the scorching effect of the zinc oxide is inhibited, milling the remainder of the polymer with the remainder of the magnesium oxide and a small portion of the ethanolamine, and dispersing the milled material in a solvent and incorporating therewith the diethylamine and the balance of the ethanolamine.

ALEXANDER D. MACDONALD.

CERTIFICATE OF CORRECTION.

Patent No. 2,163,611. June 27, 1939.

ALEXANDER D. MACDONALD.

It is hereby certified that error appears in the printed specification of the above numbered patent requiring correction as follows: Page 2, first column, line 38, for "monoethanolamide" read monoethanolamine; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.